United States Patent [19]
Holland et al.

[11] Patent Number: 6,078,980
[45] Date of Patent: Jun. 20, 2000

[54] REGULATING A DATA TRANSFER TIME

[75] Inventors: Kenneth C. Holland, Hillsboro; David M. Lee, Portland; Susan S. Meredith, Hillsboro, all of Oreg.

[73] Assignee: Intel Corporation, Santa Clara, Calif.

[21] Appl. No.: 09/222,213

[22] Filed: Dec. 29, 1998

[51] Int. Cl.[7] .................................................. G06F 13/00
[52] U.S. Cl. ........................... 710/129; 710/6; 710/100; 710/103; 713/400; 713/401
[58] Field of Search .................................. 710/129, 100, 710/6; 395/559, 552; 370/448

[56] References Cited

U.S. PATENT DOCUMENTS

| | | | |
|---|---|---|---|
| 4,949,249 | 8/1990 | Lefsky et al. | 395/559 |
| 5,463,739 | 10/1995 | Albaugh et al. | 710/6 |
| 5,717,932 | 2/1998 | Szczepanek et al. | 710/260 |
| 5,778,194 | 7/1998 | McCombs | 710/100 |
| 5,872,959 | 2/1999 | Nguyen et al. | 395/552 |
| 5,894,559 | 4/1999 | Krishna et al. | 370/448 |
| 5,898,895 | 4/1999 | Williams | 710/60 |

*Primary Examiner*—Ayaz R. Sheikh
*Assistant Examiner*—Eric S. Thlang
*Attorney, Agent, or Firm*—Trop, Pruner & Hu, P.C.

[57] ABSTRACT

A computer system includes a bus, a first bus device, a core circuit and a second circuit. The first bus device is coupled to the bus and adapted to finish a first indication of data to a portion of a bus beginning at a first clock cycle. The bus is capable of skewing the first indication to produce a second indication of the data at another portion of the bus beginning at another clock cycle. The second circuit is coupled to the bus and is adapted to receive an indication of a selected latency time. The second circuit is also adapted to transfer the data to the core circuit in response to the second indication and regulate the transfer so that the circuit receives the data beginning at the selected latency time after the first clock cycle.

19 Claims, 10 Drawing Sheets

| F16Data#[2:0] | LATENCY |
|---|---|
| 111 | Determinism not used |
| 110 | 1 clock |
| 101 | 2 clock |
| 100 | 3 clock |
| 011 | 4 clock |

REGULATING A DATA TRANSFER TIME

BACKGROUND

The invention relates to using determinism with a bus.

Figure 1:
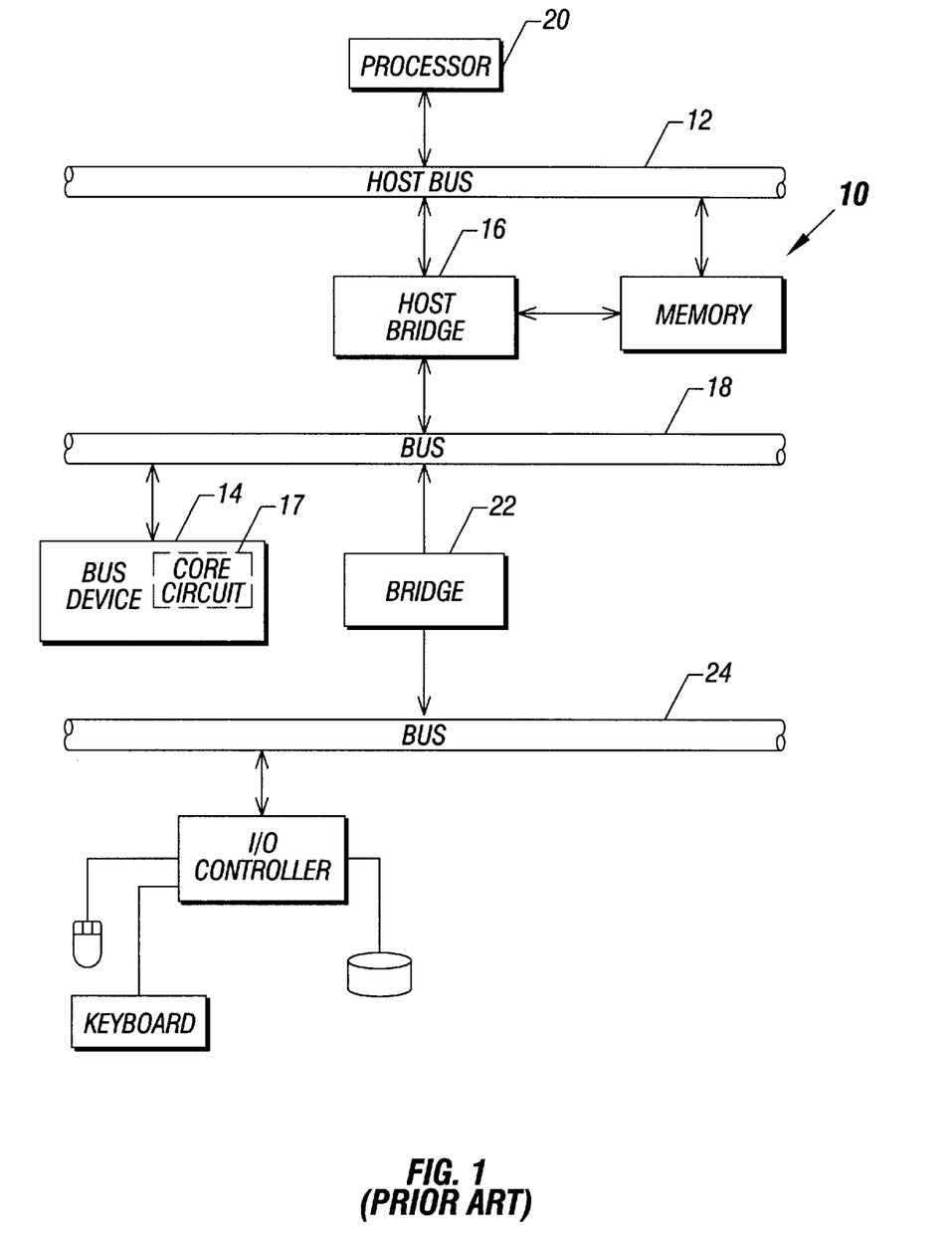
FIG. 1 is a schematic diagram of a computer system according to the prior art.

Referring to FIG. 1, a typical computer system 10 may include many devices that interact with a processor 20 (a central processing unit (CPU), as an example) of the system 10. For example, the processor 20 may write to a register of a bus device 14 by furnishing a write transaction to a host bus 12. However, the bus device 14 may not directly respond to transactions that appear on the host bus 12, but rather the bus device 14 may respond to transactions that appear on another bus 18 that is directly coupled to the bus device 14. For purposes of reproducing the write transaction on the bus 18, the computer system 10 may include a host bridge 16 that is coupled between the buses 12 and 18. The bridge 16 also completes the transaction on the host bus 12 based on the response provided by the bus device 14. The computer system 10 may include additional bridges to interface additional buses together, such as a bridge 22 that is coupled between the bus 18 and another bus 24, for example.

The transfer of the transaction from the host bridge to the bus device 14 may not be instantaneous, but rather, the bus 18 may skew the signals that represent the transaction to introduce a propagation delay. This delay may be a function of voltages and temperatures of the system 10 and may vary over time.

In some cases, it may be desirable to select how many clock cycles are required for data of the transaction to propagate along the bus 18 from the bridge 16 to core circuitry 17 of the bus device 14. For example, redundant subsystems (not shown) may be coupled to the bus 18, and as a result, for coherency reasons, it may be desirable for both subsystems to concurrently receive the same data in case one subsystem fails. As another example, the ability to predict the number of clock cycles may be helpful in debugging a bridge chip set.

SUMMARY

In one embodiment, a method for use with a computer system includes indicating a predetermined data transfer time and furnishing a first indication of data to a portion of a bus beginning at a first clock cycle. The bus is capable of skewing the first indication to produce a second indication of the data at another portion of the bus during another clock cycle. The data is transferred to a circuit in response to the second indication, and the transfer is regulated so that the first clock cycle and the other clock cycle are approximately separated by the predetermined data transfer time.

In another embodiment, a computer system includes a bus, a first bus device, a core circuit and a second circuit. The first bus device is coupled to the bus and adapted to furnish a first indication of data to a portion of a bus beginning at a first clock cycle. The bus is capable of skewing the first indication to produce a second indication of the data at another portion of the bus beginning at another clock cycle. The second circuit is coupled to the bus and is adapted to receive an indication of a selected latency time. The second circuit is also adapted to transfer the data to the core circuit in response to the second indication and regulate the transfer so that the circuit receives the data beginning at the selected latency time after the first clock cycle.

In yet another embodiment, a bus device includes a core circuit, and a bus interface. The bus interface is coupled to a bus and adapted to receive an indication of data from the bus beginning at a first clock cycle. The indication is provided to the bus beginning with a prior clock signal. The bus interface is also adapted to transfer the data to the core circuit in response to the indication and regulate the transfer so that the core circuit receives the data beginning at a selected latency time after the prior clock cycle.

DETAILED DESCRIPTION

Figure 2:
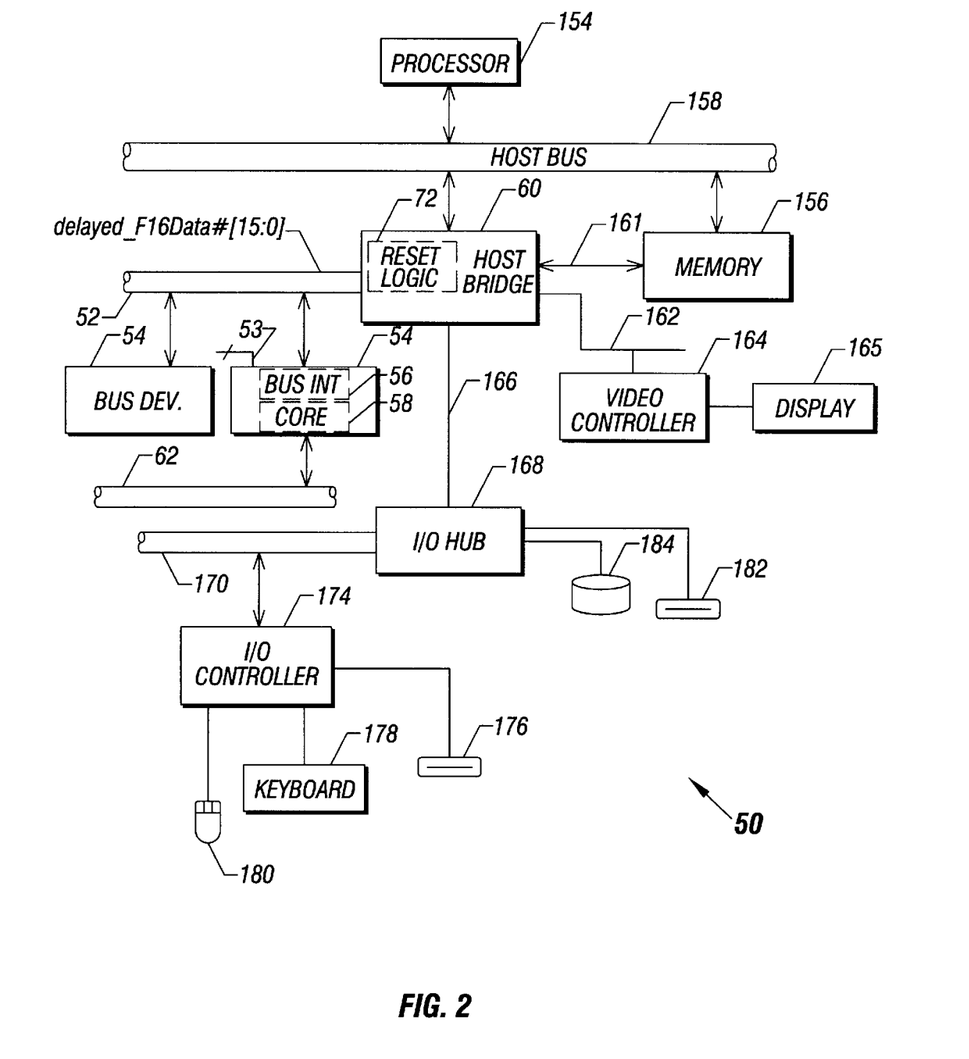
FIG. 2 is a schematic diagram of a computer system according to an embodiment of the invention.
Figure 7:
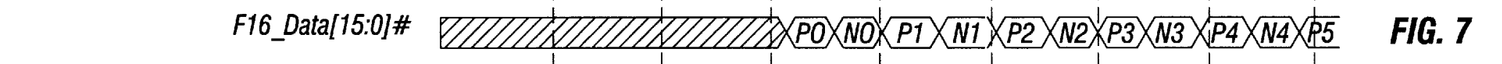

Referring to FIG. 2, an embodiment 50 of a computer system in accordance with the invention may include a bus device 54 (one of possibly several bus devices 54) that, via a bus 52, may receive a transaction that is furnished by a host bridge 60. In the course of furnishing this transaction to the bus 52, the host bridge 60 may furnish digital signals (called F16_Data[15:0]# (wherein the "#" suffix denotes negative, or inverse, logic)) that indicate data of the transaction, as depicted in FIG. 7. Although the host bridge 60 may furnish the F16_Data[15:0]# signals to the bus 52 beginning on a particular clock cycle (cycle number "4" of a clock signal named XClk (see FIG. 3), for example), a delayed version (called delayed_F16Data[15:0]# and shown in FIG. 10) of the F16_Data[15:0]# signals may not be received by the bus device 54 until several clock cycles later due to the delay caused by the skewing of signals by the bus 52.

Figure 10:
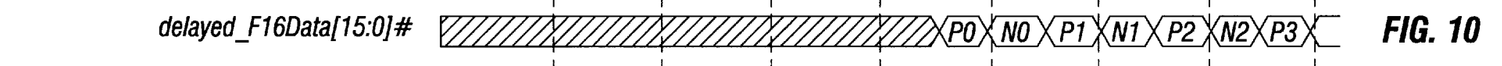

For example, as depicted in FIG. 10, the delayed_F16Data[15:0]# signals do not appear near the bus device 54 until clock cycle number "5." In other embodiments, the delayed_F16Data[15:0]# signals may not appear until other clock cycles, such as clock cycle number "6," as the skew introduced by the bus 52 may be variable due to fluctuations in voltages, temperature or other operating conditions of the computer system 50. However, regardless of the delay introduced by the bus 52, in some embodiments, the computer system 50 is adapted to permit selection of a data transfer time, or latency time.

The latency time, in some embodiments, may refer to the time that elapses between the time when the host bridge 60 finishes the F16_Data[15:0]# signals and the time when core circuitry 58 of the bus device 54 receives signals (from a bus interface 56) that indicate the corresponding data. The latency time, in turn, may be selected via one of a set of latency values, described below. Thus, the computer system 50 implements a deterministic scheme to permit selection of a latency value for the propagation of data from the host bridge 60 to the core circuitry 58, and the latency time may be independent of the length of the bus 52. The latency value may directly correspond to the number of cycles of the XClk signal that elapse between the cycle when the host bridge 60 furnishes the data and the cycle when the data is received by the core circuitry 58.

In this context, the term "core circuitry" generally refers to circuitry of the bus device 54 that processes the data and performs functions other than receiving the data from the bus 52. The bus device 54 may be, as an example, a Peripheral Component Interconnect (PCI) bridge that interfaces a PCI bus 62 to the rest of the computer system 50. The PCI protocol is described in detail in The PCI Specification that is available from The PCI Special Interest Group, Portland, Oreg. 97214.

Figure 3:
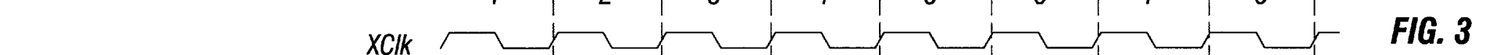
FIGS. 3, 4, 5, 6, 7, 8, 9, 10, 11, 12, 13, 14 and 15 are timing diagrams of signals of the computer system of FIG. 2 according to an embodiment of the invention.
Figure 11:
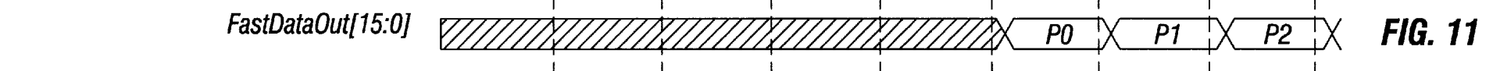
Figure 12:
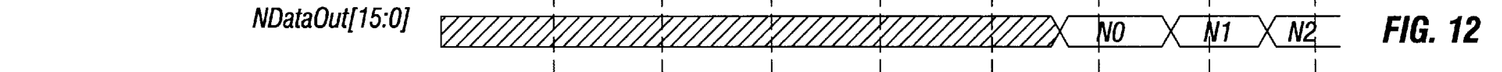

Referring also to FIGS. 3, 7, 11 and 12, as an example, the selected bus latency value may indicate two clock cycles of the XClk signal (see FIG. 3). As a result, the bus interface 56 may furnish (to the core circuitry 58) digital signals (called FastDataOut[15:0] and NDataOut[15:0], as depicted in FIGS. 11 and 12) that indicate particular data precisely two clock cycles (as an example) after the host bridge 60 furnishes (via the F16_Data[15:0]# signals) the data to the bus 52. For this example, the two clock cycle delay holds true if the bus 52 introduces any delay in the range of zero to two clock periods.

In some embodiments, the latency value may be selected by strapping pins 53 of a device of the computer system 50, such as the bus device 54. In this manner, the strapping pins 53 may be selectively tied to predefined logic levels to select a particular latency value and indicate the selected latency value to the core circuitry 58, for example. The core circuitry 58, in turn, may (in some embodiments) indicate the selected latency value to the host bridge 60 in one of many different ways. For example, the core circuitry 58 may indicate the selected latency value by controlling the logic levels of predetermined lines of the bus 52 when a bus reset signal (called XRST#) is asserted (driven low, for example). In some embodiments, latches (not shown) of the host bridge 60 capture the desired latency mode on the deassertion (driving high, for example) of the XRST# signal, and the core circuitry 58 may relinquish control of the lines of the bus 52 after the de-assertion (driving low, for example) of a signal called WritePtrRst, further described below.

Figure 20:
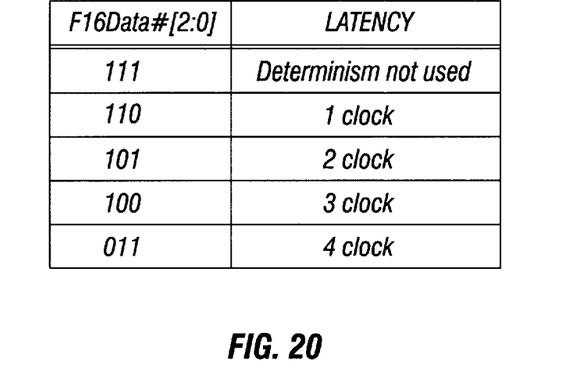
FIG. 20 is a table illustrating signals to select different latency values for a bus of the computer system of FIG. 2.

As an example, the above-described predetermined lines may be three data lines of the bus 52, and the signals on the respective lines may be labeled F16_Data[2:0]# for purposes of this example. Different possible values for the latency mode and the corresponding logical levels of the F16_Data[2:0]# signals are illustrated in FIG. 20. It is to be noted that, in this example, when the F16_Data[2:0]# signals are set to "111b," (wherein the suffix "b" denotes a binary representation) the deterministic scheme is not used and thus, the latency value is not selected.

Figures 13, 14:
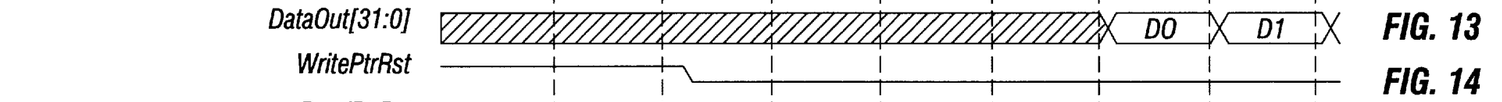
Figure 15:
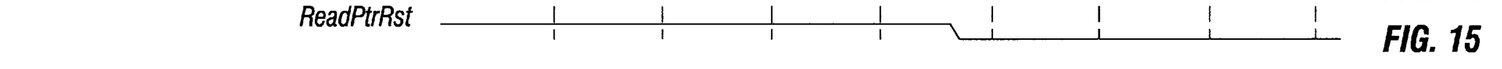

In some embodiments, the bus interface 56 synchronizes the flow of data into and out of the bus interface 56 via a write pointer reset signal (called WritePtrRst and shown in FIG. 14) and a read pointer reset signal (called ReadPtrRst and shown in FIG. 15), respectively. The WritePtrRst and ReadPtrRst signals may, in some embodiments, be furnished by reset logic 72 (see FIG. 2) of the host bridge 60, and in some embodiments, these signals may be furnished by reset logic (not shown) of the bus device 54. In this manner, the reset logic 72 may deassert (drive low, for example) the WritePtrRst signal a predetermined number of clock cycles after the host bridge 60 begins furnishing the data to the bus 52 for purposes of storing the data in the bus interface 56. The reset logic 72 may deassert (drive low, for example) the ReadPtrRst signal a predetermined number of clock cycles after the host bridge 60 begins furnishing the data to the bus 52 for purposes of retrieving the data from the bus interface 56 (and providing the data to the core circuitry 58).

In some embodiments, the bus interface 56 uses the XClk clock signal (shown in FIG. 3) to synchronize operations of the bus interface 56 to operations of the host bridge 60. In this manner, a phase locked loop (PLL) or a delay locked loop (DLL) may be located in the host bridge 60 and may also be located in the bus device 54 to ensure that the XClk signal is synchronized to the host bridge 60 and the bus device 54.

Figure 4:
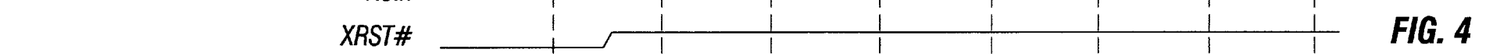

The host bridge 60 begins furnishing data to the bus 52 after the XRST# signal (see FIG. 4), a signal that is synchronized to the XClk signal, is de-asserted (driven low, for example). As an example, the host bridge 60 may begin furnishing the data to the bus 52 two clock cycles (for a latency value of "2," for example) after the deassertion of the XRST# signal. Thus, as shown in FIGS. 3, 4, and 7, for this example, if the XRST# signal is deasserted in clock cycle number "2," the host bridge 60 begins furnishing the data during clock cycle number "4."

To summarize, the XRST# signal is de-asserted before the host bridge 60 furnishes data (via the F16_Data[15:0]# signals) to the bus 52. After the XRST# signal is de-asserted, the reset logic 72 deasserts the ReadPtrRst signal a predetermined number of clock cycles later to cause the bus interface 56 to begin furnishing the data to the core circuitry 58. However, before the reset logic 72 deasserts the ReadPtrRst signal, the reset logic 72 deasserts the WritePtrRst signal a predetermined number of clock signals after the deassertion of the XRST# signal for purposes of storing the data in the bus interface 56. Thus, the reset logic 72 adjusts the time between the de-assertion of the WritePtrRst signal and the de-assertion of the ReadPtrRst signal to set the selected latency. As described further below, the bus interface 56 may include one or more buffers (first-in-first-out (FIFO) memories, for example) to temporarily store the data before the bus interface 56 provides the data to the core circuitry 58.

Figure 5:
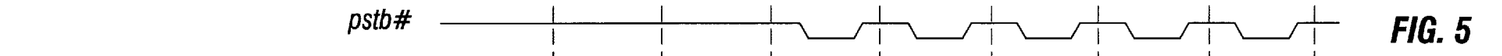
Figure 6:
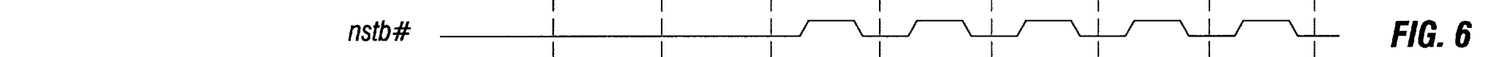
Figure 8:
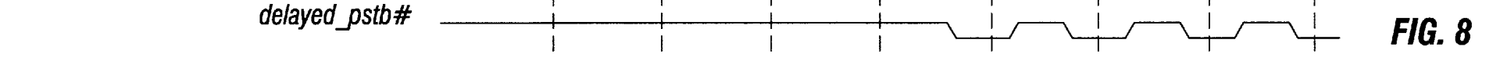
Figure 9:
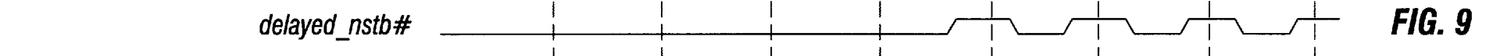

Referring to FIGS. 7 and 10, in some embodiments, the F16_Data[15:0]# signals (and the resulting delayed_F16Data[15:0]# signals) may be clocked at approximately twice the frequency of the XClk signal. In this manner, during a write transaction, the host bridge 60 may time multiplex the data by causing the F16_Data[15:0]# signals to indicate the first half (denoted by the prefix "P") of a double word during the first half of each cycle of the XClk signal and cause the F16_Data[15:0]# signals to indicate the latter half (denoted by the prefix "N") of the double word during the latter half of each cycle of the XClk signal. To control the reception of the data by the bus interface 56, host bridge 60 may furnish strobe signals called pstb# (see FIG. 5) and nstb# (see FIG. 6) that the bus 52 skews to produce strobe signals called delayed_pstb# (see FIG. 8) and delayed nstb# (see FIG. 9), respectively, near the bus device 54. The bus interface 56, in turn, uses the delayed_pstb# and delayed_nstb# signals to clock the data from the bus 52 into the bus interface 56. More particularly, in some embodiments, the bus interface 56 receives the latter half of the double word on each negative edge of the delayed_ nstb# signal and receives the first half of the double word on each negative edge of the delayed stb# signal. As described further below, the bus interface 56 may indicate the full doublewords to the core circuitry 58 via signals called DataOut[31:0] (see FIG. 13).

Figure 16:
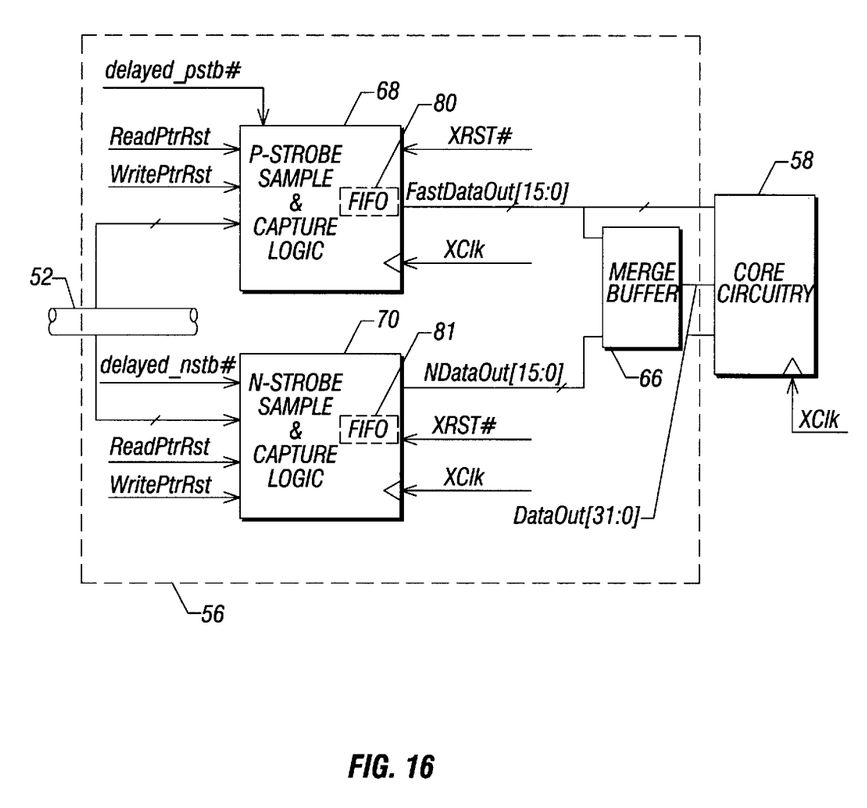
FIG. 16 is a schematic diagram of a bus interface circuit of a bus device of the computer system of FIG. 2.

Referring to FIG. 16, in some embodiments, the bus interface 56 may include N-strobe sample and capture logic 70 that is adapted to receive the latter half of each double word and P-strobe sample and capture logic 68 that is adapted to receive the first half of each double word. The logic 70 may include a FIFO memory 81 to store the received data. In this manner, the data is written from the bus 52 and into the FIFO memory 81 pursuant to the delayed__nstb# signal after the reset logic 72 deasserts the WritePtrRst signal. The reset logic 72 may also selectively deassert the ReadPtrRst signal to control when the data is retrieved, or read, from the FIFO memory 81. Similarly, the logic 68 may include a FIFO memory 80 to store the received data, and the appropriate data is written into the FIFO memory 80 pursuant to the delayed__pstb# signal after the reset logic 72 deasserts the WritePtrRst signal. When the reset logic 72 deasserts the ReadPtrRst signal, the data is retrieved from the FIFO memory 80.

The bus interface 56 may also include a merge buffer 66 that furnishes signals (called DataOut[31:0]) that indicate the data to the core circuitry 58. The merge buffer 66 receives the NDataOut[15:0] signals from the logic 70 and the FastDataOut[15:0] signals from the logic 68. The merge buffer 66 combines these signals to form the corresponding original double word that is indicated by the DataOut[31:0] signals.

Figure 17:
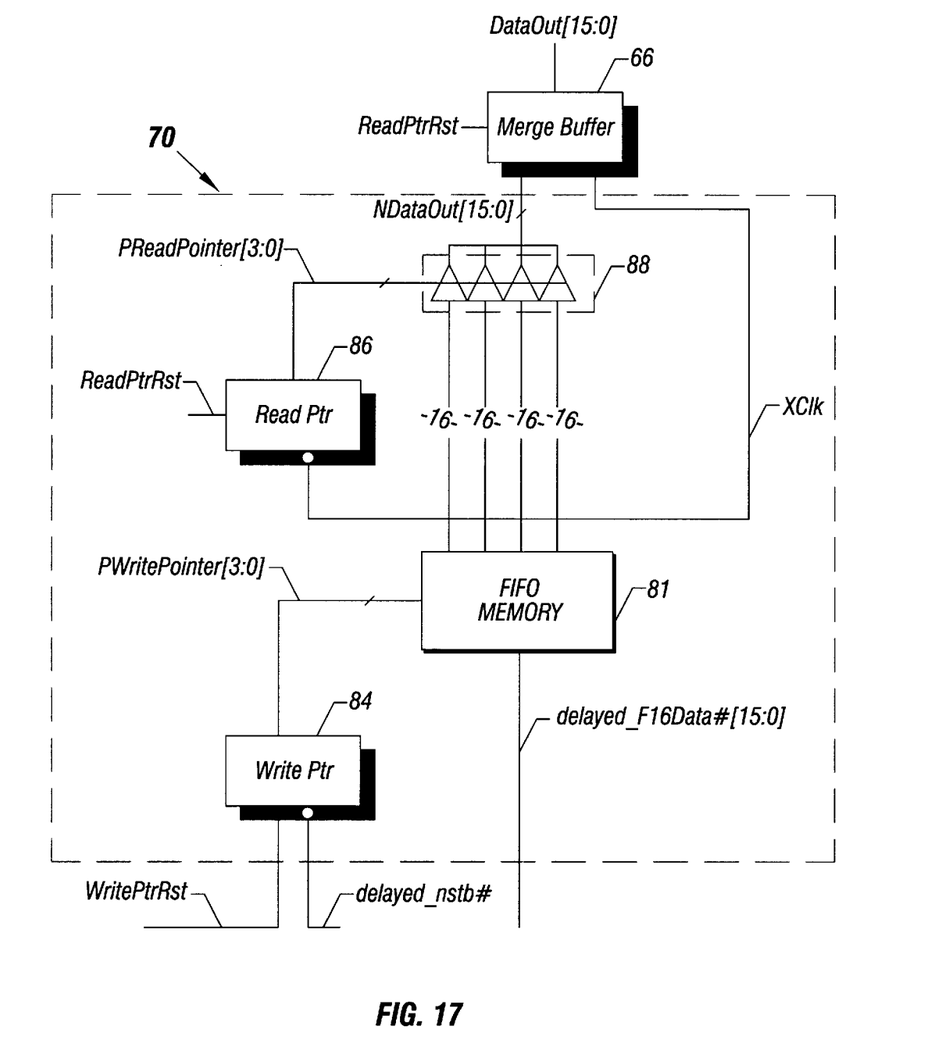
FIGS. 17 and 18 are schematic diagrams of logic of the bus interface circuit of FIG. 16.

Referring to FIG. 17, in some embodiments, the N-strobe sample and capture logic 70 may include the FIFO memory 81 that receives the delayed__F16Data[15:0]# signals as controlled by a write pointer 84 of the logic 70. In this manner, the write pointer 84 may furnish write enable signals to select a location of the FIFO memory 81 to store the next incoming word of the data. The logic 70 may also include a read pointer 86 that furnishes read enable signals to selectively enable tri-state buffers 88 to select a location of the FIFO memory 81 for purposes of retrieving a word from the FIFO memory 81. In some embodiments, the write pointer 84 is initialized to indicate one FIFO memory location ahead of the location indicated by the read pointer 86 when the write 84 and read 86 pointers are initialized by the assertion of the XRST# signal. As an example, during the assertion of the XRST# signal, the read pointer 86 may allow location "0" of the FIFO memory 81 to flow through to the tri-state buffers 88 and allow location "1" of the FIFO memory 81 to be open to receive data.

In some embodiments, the write pointer 84 is clocked by the negative edge of the delayed__nstb# signal, and the read pointer 86 is clocked by the negative edge of the XClk signal. Due to this arrangement, on the first negative edge of the XClk signal after the ReadPtrRst signal is deasserted, the read pointer 86 increments to FIFO location number "1" (for example) so that the NDataOut[15:0] signals indicate the word stored in FIFO location number "1." On the subsequent positive edge of the XClk signal, the word is stored in the sixteen least significant bits of the merge buffer 66.

Figure 18:
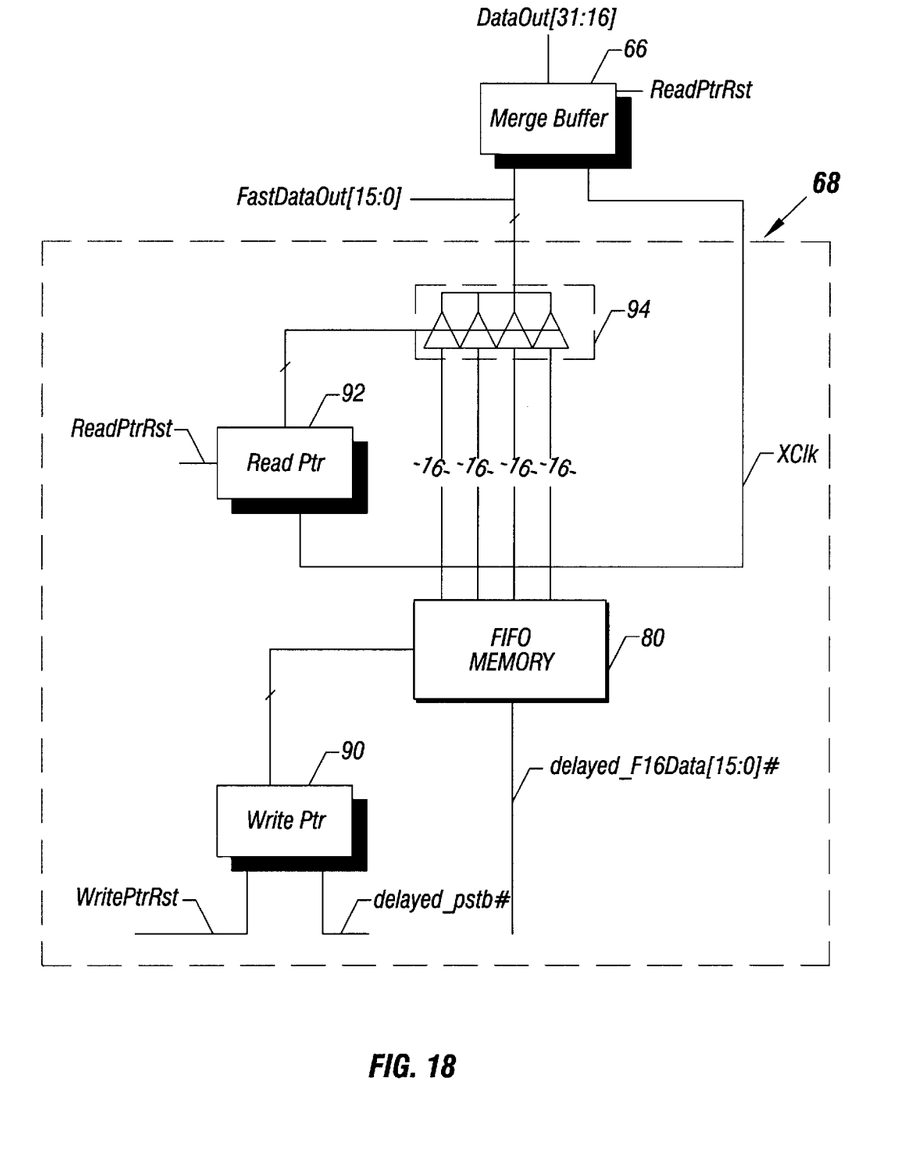

Referring to FIG. 18, the P-strobe sample and capture logic 68 has a similar design to the logic 70 with some of the main differences being pointed out below. In particular, the logic 70 includes a write pointer 90 (for the FIFO memory 80) that is clocked on the negative edge of the delayed__pstb# signal. A read pointer 92 (for the FIFO memory 80) is clocked on the positive edge of the XClk signal. The FIFO memory 80 receives the delayed__F16Data[ 15:0]# signals, and the location (of the FIFO memory 80) that is pointed to by the read pointer 92 is coupled to tri-state buffers 94. The tri-state buffers 94, in turn, furnish the FastDataOut[15:0] signals, and the merge buffer 66 captures the logical states of the FastDataOut[15:0] signals to form the DataOut[31:16] signals. Similar to the pointers of the logic 70, the enablement of the read pointer 92 is controlled by the ReadPtrRst signal, and the enablement of the write pointer 90 is controlled by the WritePtrRst signal.

Figure 19:
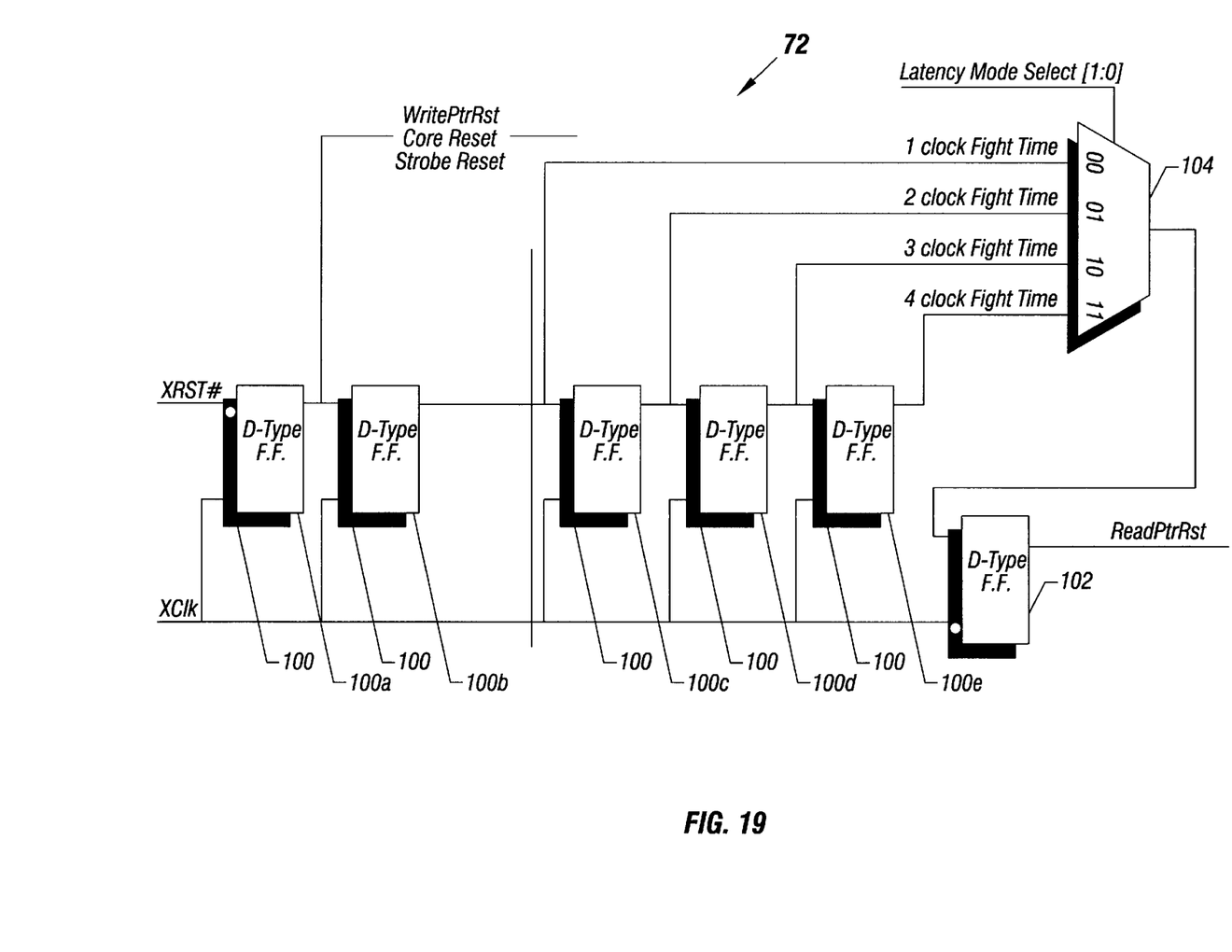
FIGS. 19 and 22 are schematic diagrams of reset circuitry of the computer system of FIG. 2 according to different embodiments of the invention.

Referring to FIG. 19, the reset logic 72 may include D-type flip-flops 100 (flip-flops 100*a*, 100*b*, 100*c*, 100*d* and 100*e*, as examples) that are serially coupled together to form a delay chain for delaying the XRST# signal by a predetermined number of clock cycles. Each flip-flop 100 is clocked by the XClk signal. The flip-flop 100*a* receives the XRST# signal at its inverting input terminal and furnishes the WritePtrRst signal. The output terminals of the flip-flops 100*b*, 100*c*, 100*c* and 100*d* are coupled to different input terminals of a multiplexer 104. The select input terminals of the multiplexer 104 are coupled to the LatencyModeSelect [1:0] signals that are provided by the core circuitry 58 (via the bus 52, for example), for example, to indicate the selected latency value. In this manner, the output signal of the multiplexer 104 indicates the XRST# signal delayed by a number of clock cycles that is selected by the LatencyModeSelect[1:0] signals. The output signal of the multiplexer 104, in turn, is received by a D-type flip-flop 102 that furnishes the ReadPtrRst signal.

Figure 21:
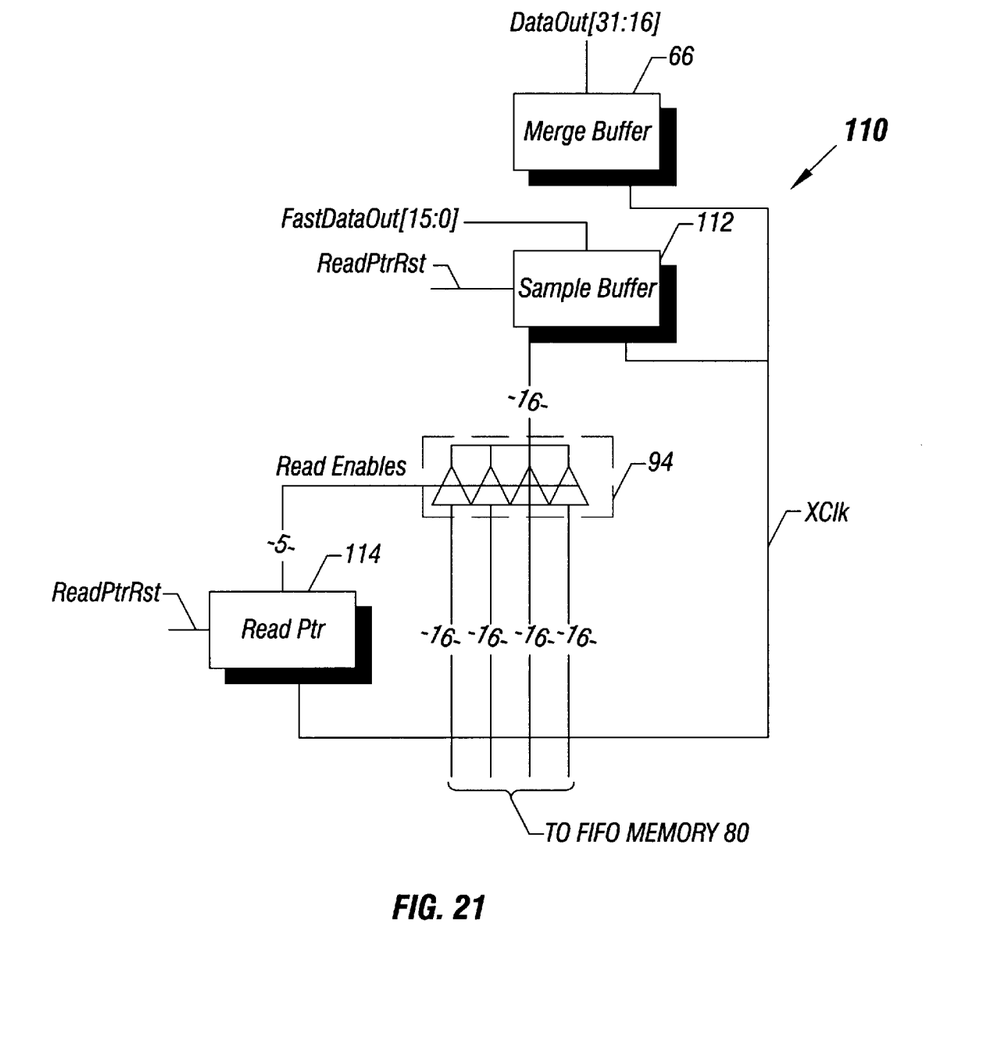
FIG. 21 is a schematic diagram of logic of the computer system of FIG. 2 according to an embodiment of the invention.

Referring to FIG. 21, in some embodiments, the P-strobe capture and sample logic 68 may be replaced by P-strobe capture and sample logic 110 if the read latency of the FIFO memory 80 is larger than the core circuitry 58 can tolerate. The logic 110 has a similar design to the logic 68 with the differences being pointed out below. In particular, the logic 110 includes a sample buffer 112 that is coupled between the output terminals of the tri-state buffers 94 and the input terminals of the merge buffer 66. The sample buffer 112 is clocked by the XClk signal. For purposes of achieving the desired latency, a read pointer 114 (that replaces the read pointer 92) is initialized to indicate one FIFO location ahead of the initialized read pointer 92, i.e., the read 114 and write 90 pointers both indicate the same location when initialized. For this embodiment, the data and strobe lines from the bus 52 meet a setup time of the sample buffer 112.

In some embodiments, the N-strobe capture and sample logic 70 may also use a sample buffer of similar design to the sample buffer 112 to compensate for latency problems that are associated with the FIFO memory 81.

As described above, in some embodiments, the host bridge 60 may include latches to capture the selected latency that is provided by the core circuitry 58 of the bus device 54. In this manner, the core circuitry 58 furnishes the LatencyModeSelect[1:0] signals to the reset logic 72 to select the appropriate latency. Referring back to FIG. 17, to accomplish this, the read 86 and write 84 pointers are initialized during reset to point to the same location in the FIFO memory 81. Thus, during reset, the signals furnished by the expansion bus device 59 to select the latency flow through the FIFO memory 81 and into the core circuitry of the host bridge 60. The core circuitry of the host bridge 60, in turn, latches the logical states of these signals when the reset logic 72 de-asserts the WritePtrRst signal.

Figure 22:
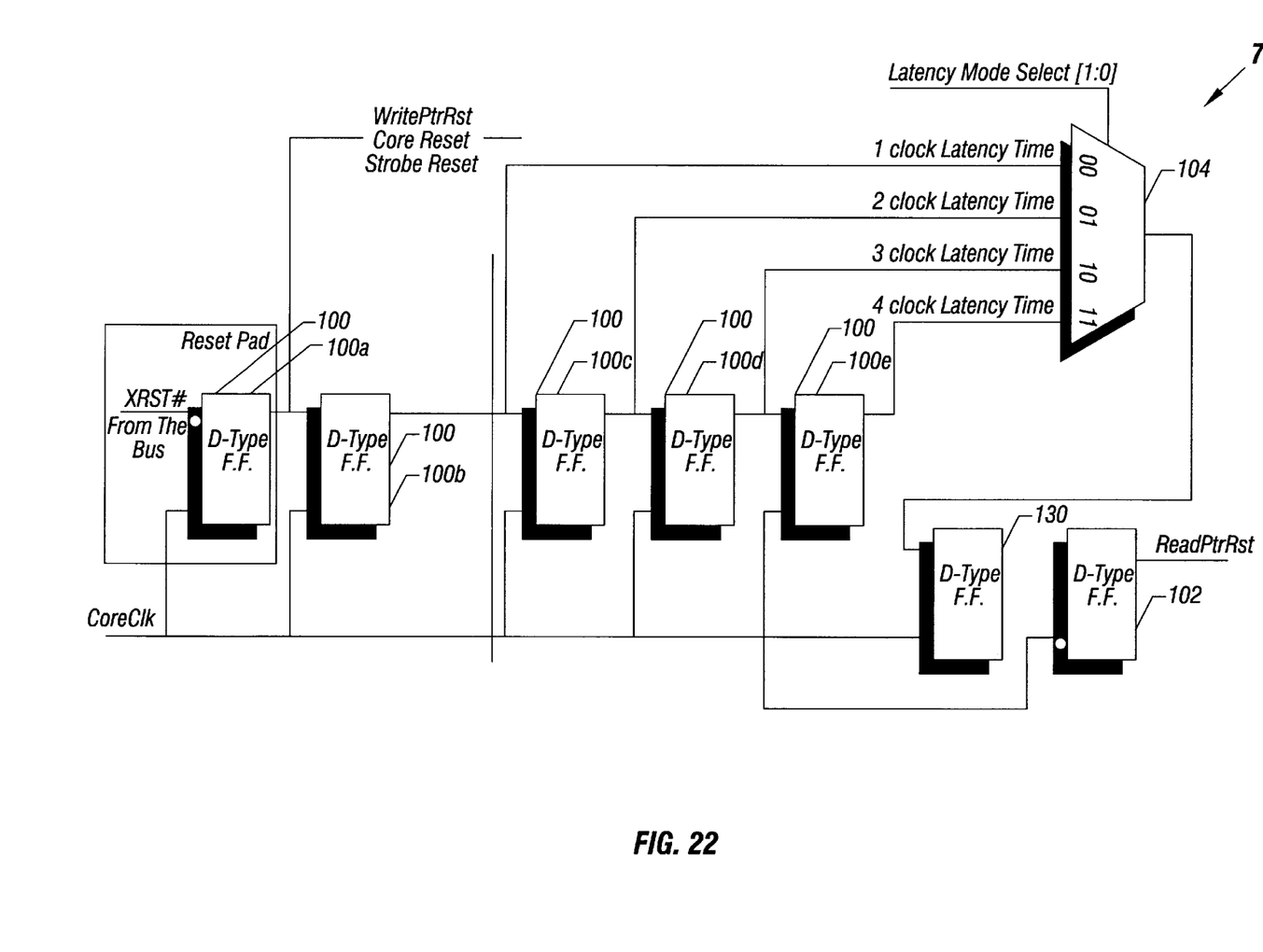
Figure 23:
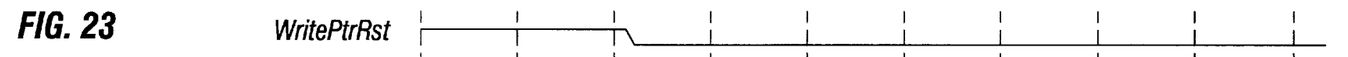
FIGS. 23, 24, 25, 26 and 27 are timing diagrams illustrating signals of the computer system of FIG. 2 according to an embodiment of the invention.
Figure 24:
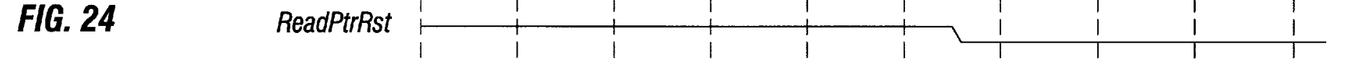
Figure 25:
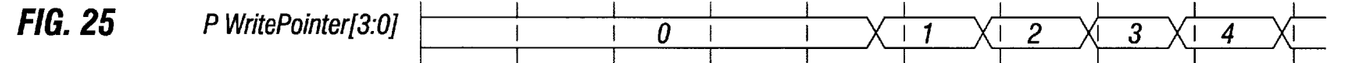
Figure 26:
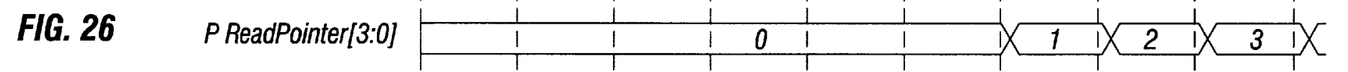

In some embodiments, at the end of reset, the write pointer 84 indicates one FIFO memory location ahead of the read pointer 86. To make this occur, the reset logic 72 may be replaced by reset logic 73 that is depicted in FIG. 22. The reset logic 73 has a similar design to the reset logic 72 except that the logic 73 includes an additional D-type flip-flop 130 that is coupled between the output terminal of the multiplexer 104 and the input terminal of the flip-flop 102. The flip-flop 130 is clocked by the XClk signal. In this manner, the flip-flop 130 delays the ReadPtrRst signal by one cycle of the XClk signal to allow the write pointer 84 to indicate one location ahead of the location indicated by the read pointer 86 before the read pointer 86 comes out of reset.

Figure 27:
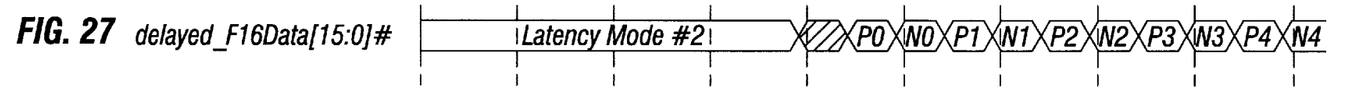

The timing of the above-described flow-through scheme is illustrated in FIGS. 23, 24, 25, 26 and 27. While the reset logic 73 asserts the WritePtrRst signal (see FIG. 23), the write pointer 84 (see FIG. 17) provides signals (called PWritepointer[3:0] and shown in FIG. 25) that point to location "0" in the FIFO memory 81, and likewise, while the reset logic 73 asserts the WritePtrRst signal, the read pointer 86 (see FIG. 17) provides signals (called PReadPointer[3:0] and shown in FIG. 26) that point to location "0." Also when the WritePtrRst signal is asserted, the bus device 54 sets the logical levels of the predetermined lines of the bus 52 to select the latency values, as depicted in FIG. 27 for the example of a latency of two clock cycles. After the reset logic 73 deasserts the WritePtrRst signal, the read pointer 86 is held in reset one clock cycle longer than the write pointer 84, and as a result, the PReadPointer[3:0] signals indicate FIFO memory location "1" one clock cycle after the PWritePointer[3:0] signals indicate FIFO memory location "1."

Referring back to FIG. 2, besides the above-described circuitry, the computer system 50 may include a processor 154 that is coupled to a host bus 158. In this context, the term "processor" may generally refer to one or more central processing units (CPUs), microcontrollers or microprocessors (an X86 microprocessor, a Pentium microprocessor or an Advanced RISC Controller (ARM), as examples), as just a few examples. Furthermore, the phrase "computer system" may refer to any type of processor-based system that may include a desktop computer, a laptop computer, an appliance or a set-top box, as just a few examples. Thus, the invention is not intended to be limited to the illustrated computer system 50 but rather, the computer system 50 is an example of one of many embodiments of the invention.

The host bus 158 may be coupled by the host bridge 60 to an Accelerated Graphics Port (AGP) bus 162. The AGP is described in detail in the Accelerated Graphics Port Interface Specification, Revision 1.0, published in Jul. 31, 1996, by Intel Corporation of Santa Clara, Calif. The AGP bus 162 may be coupled to, for example, a video controller 164 that controls a display 165. The host bridge 60 may also couple the AGP bus 162 and the host bus 158 to a memory bus 161. The memory bus 161, in turn, may be coupled to a system memory 156.

The host bridge 60 may also be coupled (via a hub link 166) to another bridge, or input/output (I/O) hub 168, that is coupled to an I/O expansion bus 170. The I/O hub 168 may, in turn, be coupled to, as examples, a CD-ROM drive 182 and a hard disk drive 184. The I/O expansion bus 170 may be coupled to an I/O controller 174 that controls operation of a floppy disk drive 176 and receives input data from a keyboard 178 and a mouse 180, as examples.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a computer system, comprising:
   indicating a predetermined data transfer time;
   furnishing a first indication of data to a portion of a bus beginning at a first clock cycle, the bus being capable of skewing the first indication to produce a second indication of the data at another portion of the bus;
   in response to the second indication, storing a third indication of the data in a memory; and
   at the beginning of another clock cycle, communicating the third indication of the data to a circuit in response to the second indication; and
   regulating the communication so that the first clock cycle and said another clock cycle are approximately separated by the predetermined data transfer time.

2. The method of claim 1, wherein the predetermined data transfer time comprises one or more clock periods.

3. The method of claim 1, wherein the act of storing the third indication in the memory comprises:
   storing the third indication in the memory beginning after a second predetermined number of clock cycles after the first clock cycle.

4. The method of claim 1, further comprising:
   synchronizing the acts of furnishing and communicating to a common clock signal.

5. The method of claim 1, wherein the act of indicating comprises:
   furnishing an indication of the predetermined data transfer time to the bus.

6. A computer system comprising:
   a bus;
   a first bus device coupled to the bus to furnish a first indication of data to a portion of a bus beginning at a first clock cycle, the bus being capable of skewing the first indication to produce a second indication of the data at another portion of the bus;
   a core circuit; and
   a second circuit coupled to the bus to:
      receive an indication of a selected latency time,
      in response to the second indication, store a third indication of the data in a memory of the second circuit,
      beginning on another clock cycle, communicate the third indication of the data to the core circuit in response to the second indication, and
      regulate the communication so that the core circuit receives the data beginning at the selected latency time after the first clock cycle.

7. The computer system of claim 6, wherein the selected latency time comprises a predetermined number of clock cycles.

8. The computer system of claim 7, wherein the second circuit is further adapted to:
   store the data in the memory beginning at a second predetermined number of clock cycles after the first clock cycle.

9. The computer system of claim 6, wherein the second circuit comprises:
   a memory;
   a read pointer circuit to indicate locations in the memory to retrieve at least a portion of the third indication from the memory; and logic adapted to enable the read pointer circuit in response to the first clock signal.

10. The computer system of claim 9, wherein
the logic is further adapted to enable the read pointer circuit a predetermined number of clock cycles after the first clock cycle.

11. The computer system of claim 6, wherein the second circuit comprises:

a memory;

a write pointer circuit to indicate locations in the memory to store at least a portion of the third indication in the memory; and logic adapted to enable the write pointer circuit in response to the first clock signal.

12. The computer system of claim 11, wherein
the logic is further adapted to enable the write pointer circuit a predetermined number of clock cycles after the first clock cycle.

13. A bus device comprising:

a core circuit; and a bus interface coupled to a bus to:
  receive a first indication of data from the bus beginning at a first clock cycle, the first indication being provided to the bus beginning with a prior clock signal,
  in response to the first indication, store a second indication of the data in a memory of the bus interface;
  beginning on another clock cycle communicate a third indication of the data to the core circuit, and
  regulate the communication so that the core circuit receives the third indication of the data beginning at a selected latency time after the prior clock cycle.

14. The bus device of claim 13, wherein the selected latency time comprises a predetermined number of clock cycles.

15. The bus device of claim 14, wherein the bus interface is further adapted to:

store the data in the memory beginning at a second predetermined number of clock cycles after the first clock cycle.

16. The bus device of claim 13, wherein the bus interface comprises:

a read pointer circuit adapted to indicate locations in the memory to retrieve at least a portion of the third indication of the data from the memory; and logic adapted to enable the read pointer circuit in response to the first clock signal.

17. The bus device of claim 16, wherein
the logic is further adapted to enable the read pointer circuit a predetermined number of clock cycles after the first clock cycle.

18. The bus device of claim 13, wherein the bus interface comprises:

a memory;

a write pointer circuit adapted to indicate locations in the memory to store at least a portion of the second indication of the data in the memory; and logic adapted to enable the write pointer circuit in response to the first clock signal.

19. The bus device of claim 18, wherein
the logic is further adapted to enable the write pointer circuit a predetermined number of clock cycles after the first clock cycle.

* * * * *